United States Patent [19]

O'Dell et al.

[11] Patent Number: 5,728,797
[45] Date of Patent: Mar. 17, 1998

[54] METHOD OF MAKING CURED RESIN PARTICLES

[75] Inventors: Robin D. O'Dell, Pasadena; Jayesh Shah; Alice M. Simon, both of Glen Burnie, all of Md.

[73] Assignee: International Paper, Odenton, Md.

[21] Appl. No.: 516,738

[22] Filed: Aug. 18, 1995

[51] Int. Cl.⁶ .................................................. C08G 59/50
[52] U.S. Cl. ........................ 528/120; 528/230; 528/232; 528/254; 528/480; 528/499; 528/503; 524/597; 524/598; 524/843; 524/844
[58] Field of Search ........................ 528/120, 230, 528/232, 254, 480, 499, 503; 524/597, 598, 843, 844

[56] References Cited

U.S. PATENT DOCUMENTS

| | | |
|---|---|---|
| 2,119,189 | 5/1938 | Widmer . |
| 2,938,873 | 5/1960 | Kazenas . |
| 3,303,168 | 2/1967 | Kazenas . |
| 3,428,607 | 2/1969 | Renner . |
| 3,454,529 | 7/1969 | Casebolt . |
| 3,945,980 | 3/1976 | Tsubakimoto et al. . |
| 4,395,452 | 7/1983 | Scher et al. . |
| 4,400,423 | 8/1983 | Scher et al. . |
| 4,520,062 | 5/1985 | Ungar et al. . |
| 4,532,170 | 7/1985 | O'Dell et al. . |
| 4,971,855 | 11/1990 | Lex et al. . |
| 5,246,616 | 9/1993 | Bito et al. . |
| 5,344,704 | 9/1994 | O'Dell et al. . |
| 5,545,476 | 8/1996 | O'Dell et al. . |

FOREIGN PATENT DOCUMENTS 4302678   8/1994   Germany .

*Primary Examiner*—Duc Truong
*Attorney, Agent, or Firm*—Browdy and Neimark

[57] ABSTRACT

A suspension of finally divided hardened aminoplast or phenoplast resin, particularly melamine-formaldehyde resin, is prepared by mixing an aqueous solution of the resin or its precursors with a water-insoluble stabilizing agent, particularly microcrystalline cellulose; sufficient water is provided to exceed the water tolerance level of the resin and thus form a uniform emulsion or suspension of resin particles in water. Cure of the resin is then advanced such as by heating to form partially or fully cured resin particles of relatively uniform particle size.

16 Claims, No Drawings

5,728,797

1

METHOD OF MAKING CURED RESIN PARTICLES

FIELD OF INVENTION

The present invention involves the manufacture of initially water soluble resins in partially cured particulate form, and more particularly to an improved method for making solid aminoplast and phenoplast resin particles and the resultant particles.

BACKGROUND OF THE INVENTION

It is often desirable to make particles of partially cured or fully cured aminoplast and phenoplast resins such as melamine-formaldehyde resin, urea-formaldehyde resin and phenol-formaldehyde resin, commonly referred to respectively as melamine, urea and phenolic resins. These particles can be used as fillers and as molding powders. A particularly important use of such particulate materials, especially partially cured melamine resin particles, is in the manufacture of abrasion resistant aesthetic surface layer decorative laminates according to the O'Dell et al U.S. Pat. No. 5,344,704.

Until now, the standard way of making particulate aminoplast and phenoplast resins has been merely to advance cure of the liquid resin until a solid block of cured resin is obtained, which solid block is then ground or comminuted to particle size. This is a difficult and tedious process which moreover requires a substantial amount of energy expenditure during the grinding process. In addition, the quality of the particulate product obtained is variable, and sometimes poor. It would therefore be desirable to have a process of making solid particulate aminoplast and phenoplast resins either fully or partially cured, in a simple, reliable and relatively inexpensive way, and which provides a reliably high quality product.

Water-based thermosettable resins, e.g. aminoplast and phenoplast resins such as melamine resin, urea resin, and phenolic resin, have a characteristic which is sometimes known as "water tolerance". Thus, these aminoplast and phenoplast resins in the uncured state are water soluble, but when additional water is added beyond the so-called "water tolerance level", these resins begin to precipitate and form an oil in water emulsion or suspension, depending on the degree of cure. This known phenomenon is something which handlers of aminoplast and phenoplast resins have known of and have usually tried to avoid because it "ruined" the resin.

Thus, if sufficient water is added to such an aqueous thermosettable resin solution so as to exceed the water tolerance level and form an oil in water emulsion of the resin, and one then tries to advance the cure of the resin to partial or complete cure, the particles tend to coagulate and become agglomerated; and as the resin cures it forms large, hard rock-sized chunks of cured or partially cured resin which, unless these chunks can be ground to powder, are substantially useless.

A few workers in the present art have attempted to use "water tolerance" to make thermosettable resin powders. Thus, the Renner et al U.S. Pat. No. 3,428,607 discloses the manufacture of melamine resin powders of less than 1 µm particle size by slowly adding the aqueous resin or resin precursor to water containing a protective colloid such as starch, gelatin, glue, gum tragacanth, agar-agar, carboxymethyl celluloses, alkaline metal alginates and water soluble polymers such as polyvinyl alcohol, polyvinyl pyrrolidone, alkali metal salts of polyacrylic acids, etc. at a concentration between 0.01% and 10%, the formation of the particles being carried out at a pH of 6–8 and preferably at the boiling temperature of the liquid. A very similar process is disclosed in the Tsubakimoto et al U.S. Pat. No. 3,945,980, in which the resin is a benzoguanamine resin. Insofar as is known, neither these methods nor the resultant products have achieved any degree of commercial success, and thus they have been abandoned.

It is believed that a major problem in these prior attempts as disclosed in the Renner and Tsubakimoto patents has been the critical utilization of what is referred to in these patents as "protective colloids", which are water-soluble polymers or gels, including saponified polyvinyl acetate, i.e. polyvinyl alcohol, used primarily in the Tsubakimoto patent, and carboxymethyl cellulose used primarily in the Renner patent. The use of protective colloids in these methods limits the processing in that the aqueous liquid of the soluble resin must be added to the aqueous solution of protective colloid; in addition, use of the protective colloid normally requires high speed stirring and a holding or resting period while the reaction proceeds, and the degree of water tolerance cannot be less than zero, which inhibits particle size control. The major problem, however, in the use of protective colloids is that the resultant cured or partially cured resin particles obtained are not of sufficiently uniform size.

SUMMARY OF INVENTION

It is, accordingly, an object of the present invention to overcome deficiencies of the prior art, such as those indicated above.

It is another object of the present invention to provide for improved aminoplast and phenoplast resin particles, fully or partially cured, and of a selected and more uniform size, in an inexpensive and reliable manner.

It is a further object of the present invention to provide an improved method for making good quality fully or partially cured particles of aminoplast and phenoplast resins such as melamine resin, urea resin and phenolic resin.

The above and other objects of the present invention are achieved by a two- or three-step wet process which consists essentially of (1) optionally first partially curing an aqueous solution of the selected aminoplast or phenoplast resin to a desired degree of cure, (2) then adding a mixture of water and a water-insoluble stabilizing agent, namely microcrystalline cellulose or the like, to the uncured or partially cured aqueous resin solution, to cause the aqueous resin solution to form a stabilized emulsion of discrete particles, and (3) then beginning or continuing curing of the stabilized emulsion to obtain particles advanced to the desired degree of cure. Two important features of this process involve the use of a suitable water-insoluble stabilizing agent, preferably microcrystalline cellulose or the like, and the time during the process at which such stabilizing agent is added in order to control the size of the cured resin particles.

The above objects and the nature and advantages of the present invention will be apparent from the following detailed description of embodiments.

DETAILED DESCRIPTION OF EMBODIMENTS

The present invention is hereinafter described in terms of the manufacture of melamine resin particles, but it will be understood that the same process is applicable to other thermosettable resins which are water soluble in the uncured state and have the "water tolerance" characteristic, including urea, phenolic, dicyandiamide, modified melamine resins and other aminotriazine resins including those disclosed in the aforementioned Renner and Tsubakimoto patents, etc.

The solids content of the uncured aqueous resin solution is not critical, but a starting solution of 50–70% of solids is preferred.

In general, the state of cure during curing by heating of aqueous melamine resin is measured by a determination of water tolerance[1], and water tolerance (W/T) of the resin decreases as the state of cure of the resin increases. Typically, the hot resin water tolerance of an aqueous, uncured melamine resin is 1.5 units; after cooking the aqueous melamine resin at the boiling point of water for a given period of time to advance the degree of cure, the water tolerance will drop to a lower value, e.g. a hot resin W/T of 0.4 units.

[1] Water tolerance (WT) is usually determined as follows:
Measure the amount water (ml) required at 25° C. to precipitate 10 gm of melamine resin at 25° C. This amount divided by 10 gives the units of water tolerance of the given resin. In some cases water tolerance is also measured in %, in which the amount of water required to precipitate melamine resin is multiplied by 10.
For purposes of the present invention, water tolerance is determined as follows:
Measure the amount water (ml) required at 25° C. to precipitate 10 gm of hot melamine resin [hot resin as it comes out of the reactor at 100° C.] This amount divided by 10 gives the units of water tolerance for given resin. This type of water tolerance, hereinafter sometimes called "hot resin water tolerance" gives higher water tolerance values of the resin, e.g. if melamine resin at 25° C. indicates 0 water tolerance, then under hot condition it will show a water tolerance of approximate 0.75–1.2 units.

In order to exercise control of the process in order to obtain the desired particulate product, it is necessary to measure the state of cure of the resin. This is accomplished by differential scanning calorimetry (hereinafter "DSC") which measures the residual energy remaining in the resin, and thus gives a measure of the remaining degree of cure which is possible. Again using the example of melamine resin, the initial aqueous solution of uncured resin has a DSC of 80 J/g. After approximately two hours of cooking at 100° C., it has a DSC of 50 J/g. After cooking for approximately eight hours at 100° C., it has a DSC of 5 J/g, and after cooking for ten hours at 100° C. it is fully cured and has a DSC of 0 J/g.

As indicated above, if water is added to the aqueous resin without a water-insoluble stabilizing agent such as microcrystalline cellulose being present, the emulsion is unstable and as it cures, e.g. by cooking, it agglomerates and forms large rock-sized chunks. In accordance with the present invention, this problem is obviated by the use of an appropriate water-insoluble stabilizing agent such as microcrystalline cellulose which is commercially available in the form of Avicel™, a composition of about 85%–90% microcrystalline cellulose and 10%–15% carboxymethyl cellulose.

Selection of an appropriate stabilizing agent is crucial to the success of the present invention, and it has been found that in general surfactants are not suitable because during cooking they cause foaming, wetting problems, surface energy, etc. which undesirable effects would need to be cancelled out by the use of various counteracting materials. As pointed out above, protective colloids such as carboxymethyl cellulose and PVA work only poorly, and their use requires the resin solution to be added to the colloid solution rather than vice versa, which results in very small and non-uniformly sized resin particles. In contrast, the present invention permits the formation of relatively uniform particles which can be as large as 700 μm and as small as sub-micron size, i.e. less than 1 μm. Micro-crystalline cellulose, such as in the form of Avicel™, is the preferred water-insoluble stabilizing agent.

The quantity of Avicel™ used according to the present invention falls within a very narrow range, and is preferably 1.2% based on the quantity (dry solids) of resin in the aqueous solution. The range of the quantity of Avicel™, again based on dry solids of resin, is about 0.6% to about 3%. Less than 0.3% of Avicel™ does not always reliably produce the cured or partially cured resin in particulate form, i.e. a minimum of as low as 0.3% of the Avicel™ can produce a reliably stabilizing effect. The upper limit is based on practical considerations, because more than about 3% Avicel™ produces an unduly high viscosity in the solution, and also begins to make the resultant fully cured or partially cured melamine particles hazy and therefore less suitable for use in the process of O'Dell et al U.S. Pat. No. 5,344,704, although such particles can be used for other purposes, such as molding powder, filler, etc.

As indicated above, the process of the present invention is basically a two- or three-step process in which the liquid melamine resin is optionally and preferably first cooked to a desired degree of cure, then a mixture of water and water insoluble stabilizing agent, preferably Avicel™, is added to form a stabilized emulsion of discrete particles. In the third step, the cure is continued by further cooking so as to obtain discrete particles of a given mean particle size. The pH of the resin solution is not critical and may be within the range of 3 to 11 or even more, but is preferably pH 9–11. The speed of the process can be increased by the use of superatmospheric pressure.

The length of time of the optional first step, i.e. the initial curing before addition of excess water and water-insoluble stabilizing agent to exceed the water tolerance level, is what determines the size of the resultant fully cured or partially cured resin particles. In practice, the first step is optional because it may be entirely eliminated, thus changing the three-step process to a two-step process, i.e. the water and stabilizing agent may be added immediately to the aqueous resin solution before it has undergone any advancement of cure of the resin whatsoever, in which case the particles produced will be of minimum size.

The following examples are offered illustratively:

EXAMPLE 1

Comparative

A reactor is loaded with 5.45 kg of aqueous melamine resin at 50% solids. The aqueous melamine resin is cooked for about one hour at 100° C. to provide a water tolerance (W/T) of approximately 0.4 units, and 5.45 kg of water are then added to exceed the water tolerance level. The resin precipitates out and forms particles. Upon additional cooking, these particles agglomerate and eventually form a solid lump.

EXAMPLE 2

A water/Avicel™ slurry is prepared by mixing 39.2 g of Avicel™ with 5.45 kg of water. As in Example 1, a reactor is loaded with 5.45 kg of aqueous melamine resin at 50% solids and the aqueous solution is cooked for about one hour at 100° C. to provide a hot resin W/T of approximately 0.4 units (measured conventionally, the W/T is less than zero). The water/Avicel™ slurry is then added to the cooked resin and the resin precipitates and forms particles of relatively uniform size. The emulsion is cooked further, but unlike Example 1 the particles do not agglomerate and instead stay in suspension. It appears that the Avicel™ works as a suspending medium and creates a barrier between melamine resin particles preventing them from agglomerating.

EXAMPLE 3

Comparative

Example 2 is repeated using carboxymethyl cellulose instead of microcrystalline cellulose. The results are similar to Example 1.

This example is then repeated, but the aqueous melamine solution is added to the carboxymethylcellulose solution, rather than vice versa. The resin precipitates and forms very fine particles. The emulsion is cooked further, but the CMC does not fully protect the particles from agglomerating, and melamine resin particles are formed, some of which remain very fine and others of which are agglomerated into larger particles.

EXAMPLE 4

Without any precooking of the aqueous solution of 50% solids melamine resin (again 5.45 kg), a slurry as prepared in Example 2 of 39.2 g of Avicel™ and 5.45 kg. of water are slowly mixed together. The slurry of aqueous melamine resin, water and Avicel™ is loaded into a reactor and cooked under reflux and normal atmospheric pressure at about 100° C. After approximately ten hours of cooking, fully cured particles are formed having a relatively uniform mean particle size smaller than 30 μm.

EXAMPLE 5

Example 2 is repeated, the first cooking stage being for one hour. After addition of the water/Avicel™ slurry, cooking is continued for another approximately ten hours. The particles thus formed are fully cured and measure about 30 μm in size.

EXAMPLE 6

Example 2 is again repeated, this time with the initial cooking being carried out for 1.5–2.0 hours to provide a hot resin W/T of approximately 0.09 units (W/T measured conventionally is less than zero). After addition of the water/Avicel™ slurry, cooking is continued for another approximately ten hours. The particles thus formed are fully cured and are in the size range of about 100 μm.

EXAMPLE 7

Example 5 is repeated except that the second cooking operation is carried out for about an additional six hours rather than an additional ten hours. The particles thus formed are each about 90–95% cured and measure in size about 30 μm.

EXAMPLE 8

Comparative

A reactor is loaded with 8.18 kg. of aqueous melamine resin at 50% solids. A solution of 59 g of polyvinyl alcohol (PVOH) in 1 kg. of hot water is prepared in a blender, and then 3.086 kg. of water is added to the PVOH solution which is mixed for fifteen minutes.

At a water tolerance of 0.1 units of the melamine resin solution, the PVOH aqueous solution is charged to the reactor and mixing is continued. After about one hour, solids have settled out at the bottom of the reactor. Cooking is continued an additional seven hours, after which the reactor is emptied. Very fine resin particles remain in suspension, whereas heavier particles have settled to the bottom of the reactor.

Based on this comparative example, it appears that PVOH does not produce uniform particles.

EXAMPLE 9

A reactor was loaded with 4.55 kg. of 50% solids melamine resin. A uniformly mixed solution of 2.27 g of polyacrylamide as surfactant and 63 g of water were added to the melamine resin solution. The melamine resin solution was then cooked in the reactor, with reflux, at 100° C. until the hot resin water tolerance of the resin reached less than 0.1. An aqueous solution of microcrystalline cellulose, Avicel™, 13.62 g in 4.55 kg. of water, were then added and the mixture was cooked for about ten hours at 100° C., at the end of which time there were produced cured resin particles of uniform size.

EXAMPLE 10

A closed reactor was loaded with 4 gal. of a melamine resin solution at 0% solids. The resin solution was cooked at 100° C. under reflux at atmospheric pressure. When the hot resin water tolerance reached 0.4 units in approximately 1.5 hours, a slurry of 137.3 g of Avicel™ in 4 gallons of water was added and the reactor was pressurized to between 5 and 10 psi gauge. Cooking was continued for another approximately two hours to provide a total cooking term of about 3.5 hours, resulting in cured particles. This example shows that curing under increased pressure reduces the total curing time by approximately 50%.

While the above examples disclose curing by heating, curing can alternatively be effected by use of a catalyst or curing agent, or by heating in the presence of a catalyst or curing agent which can be added to the aqueous resin along with the water/stabilizing agent mixture.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. For example, additives may also be present, such as those set forth in the aforementioned Renner U.S. patent including starch and/or gelatin and/or also fumed silica, but the quantity of such additives should not be so great as to increase the viscosity of the resin solution to greater than the viscosity of a resin solution containing 3% microcrystalline cellulose. The means and materials for carrying out various disclosed functions may take a variety of alternative forms without departing from the invention. It is to be understood that the phraseology or terminology employed herein is for the purpose of description and not of limitation.

What is claimed is:

1. A method of making cured aminoplast or phenoplast particles comprising providing an aqueous solution of an aminoplast or phenoplast resin having a water tolerance level, adding a mixture of water and a water-insoluble stabilizing agent to said aqueous solution of resin to exceed the water tolerance level of said resin and thus form an emulsion or suspension of resin particles in water, and advancing cure of said resin to form partially or fully cured resin particles.

2. A method according to claim 1 wherein said advancing of cure is done by heating.

3. A method according to claim 2 wherein said advancing cure is carried out under superatmospheric pressure.

4. A method according to claim 1 wherein said water-insoluble stabilizing agent consists essentially of microcrystalline cellulose.

5. A method according to claim 1 wherein prior to said mixing step, said resin solution is subjected to partial curing.

6. A method according to claim 1 wherein said resin is melamine resin.

7. A method according to claim 4 wherein said resin is melamine resin.

8. A method according to claim 7 wherein said advancing of cure is done by heating.

9. A method according to claim 8 wherein said advancing cure is carried out under superatmospheric pressure.

10. A method according to claim 1 wherein said advancing cure is carried out under superatmospheric pressure.

11. In a method for the preparation of finely divided cured or partially cured aminoplast or phenoplast condensation product of a uniform particle size no greater than about 700 μm, which comprises heating an aqueous solution of said resin or precursors of said resin in the presence of a stabilizing agent to precipitate said resin thus forming an emulsion or suspension of solid resin particles in water until a solid phase consisting of precipitated insoluble resin particles is formed, the improvement wherein said stabilizing agent is water-insoluble.

12. A method for the preparation of finely divided cured or partially cured aminoplast or phenoplast condensation product of a uniform particle size no greater than about 700 μm, which comprises heating an aqueous solution of said resin or precursors of said resin in the presence of a water-insoluble stabilizing agent consisting essentially of microcrystalline cellulose to precipitate said resin thus forming an emulsion or suspension of solid resin particles in water until a solid phase consisting of precipitated insoluble resin particles is formed.

13. A method according to claim 11 wherein said resin is melamine-formaldehyde resin.

14. A method according to claim 13 wherein said heating is carried out at superatmospheric pressure.

15. A method according to claim 12 wherein said microcrystalline cellulose is present in a quantity of about 0.6% to about 3% based on dry solids of said resin.

16. A method according to claim 4 wherein said microcrystalline cellulose is present in a quantity of about 0.6% to about 3% based on dry solids of said resin.

* * * * *